Patented June 3, 1941

2,243,868

UNITED STATES PATENT OFFICE 2,243,868

CAKE

Morris Katzman, Chicago, Ill., assignor to The Emulsol Corporation, Chicago, Ill., a corporation of Illinois No Drawing. Application March 22, 1939, Serial No. 263,414

22 Claims. (Cl. 99—92)

My invention relates to improved unbaked and baked flour compositions and is particularly concerned with the preparation of cakes which are devoid of or substantially devoid of shortening.

Baked flour products of the non-shortening-containing type have long been known, one of the commonest types being cakes of the character of the well-known angel food cake which latter generally is made from a batter containing flour, sugar, beaten egg whites, salt, flavoring and generally a small percentage of cream of tartar or similar acidifying agent, with incorporated air as the principal leavening agent. Cakes of this type are generally characterized by a relatively open grain structure and they do not have the characteristic "shortness" and tenderness which distinguish cakes such as the conventional white and yellow layer cakes which are prepared from a batter relatively rich in shortening such as the conventional triglyceride oils and fats.

Baked flour products, such as angel food cake, which are devoid or substantially devoid of shortening, possess the marked disadvantage that, in general, the texture is such that the cake or the like possesses a "rubberiness" and the "chewability" characteristics of such cakes are decidedly different from cakes which are prepared from batters containing shortening. Nevertheless, because of the ease and simplicity of preparation, the relatively low cost, and the large volume obtained per unit of scaling weight, the baker generally prefers to sell cakes of this type although the consumer demand is relatively small compared to the demand for cakes of the type conventionally employing shortenings.

My present invention is concerned with the improvement of baked flour products, particularly cakes of the type of angel food cake, which are devoid of or substantially devoid of shortening.

A particular object of my invention is concerned with the preparation of novel and improved angel food cakes.

Another object concerns the provision of improved non-shortening-containing flour batters.

A further object is concerned with the provision of improved angel food cake batters.

A particular object of my invention relates to the improvement in volume of non-shortening-containing cakes of the type of angel food cake.

Other improvements relate to the betterment of the texture, grain, and "chewability" characteristics as well as the general outer appearance of cakes of the non-shortening-containing type such as angel food cake.

Other objects will appear in the light of the following detailed description of my invention.

I have found that when certain improving agents, hereinafter designated as reaction products of meta-phosphoric acid with alcohols, as hereinafter defined, are introduced into flour batters which are devoid or substantially devoid of shortening, such as the conventional angel food cake batters, the product when baked represent a startling improvement over similar products made without employing the novel teachings of my invention.

The improving substances which I employ herein in accordance with my invention are, in general, possessed of at least two groups, one having a hydrophile function and the other having a lipophile function in the molecule. The hydrophile function is performed primarily by a meta-phosphoric acid group or groups, tending to give the molecule of which it is a part an affinity for aqueous materials. The lipophile group is any radical having an affinity for oleaginous material such as oils, fats, hydrocarbons and the like and may comprise radicals such as hydrocarbon radicals, acyl or alkyl groups derived from aliphatic or fatty acids or their corresponding alcohols, or the like. The hydrophile meta-phosphoric acid group or groups may be attached directly to the lipophile group or may be linked thereto through a polyhydroxy substance. In this latter case, the linkage between the polyhydroxy substance and the lipophile group or groups may be an ester or ether linkage.

Since there may be some question as to the exact chemical structure of the improving agents which I employ herein, I prefer to refer to, disclose and claim them as reaction products of meta-phosphoric acid with, in general, an alcohol or alcohols, the precise nature of the alcohols being set forth hereinafter.

The lipophile groups entering into the molecular structure of my improving substances may be of simple character as, for example, in reaction products of meta-phosphoric acid with straight chain alcohols such as hexyl alcohol, octyl alcohol, decyl alcohol, lauryl alcohol, and the like, or of branch chain alcohols such as 2-ethyl-hexanol-1, 2-butyl-octanol-1, and the like.

Others of the improving substances of my invention are reaction products of meta-phosphoric acid with polyhydroxy substances, the hydrogen of at least one hydroxy group of the polyhydroxy substance being replaced by an alkyl or acyl radical containing preferably at least four carbon atoms and, more advantageously, between 8 and 18 carbon atoms. Specific examples of improving agents which I may employ in accordance with my invention are as follows:

1. The reaction product of meta-phosphoric acid with mono-olein, ammonium salt.
2. The reaction product of meta-phosphoric acid with diethylene glycol mono-ricinoleate, sodium salt.
3. The reaction product of meta-phosphoric acid with mono-laurin.
4. The reaction product of meta-phosphoric acid with mono-laurin, sodium salt.
5. The reaction product of meta-phosphoric acid with di-butyrin, sodium salt.
6. The reaction product of meta-phosphoric acid with mono-cetyl ether of sorbitol.
7. The reaction product of meta-phosphoric acid with ethylene glycol mono-stearate.
8. The reaction product of meta-phosphoric acid with mono-caprylic acid ester of diethylene glycol.
9. The reaction product of meta-phosphoric acid with mixed coconut oil fatty acid mono-esters of diethylene glycol, ammonium salt.
10. The reaction product of meta-phosphoric acid with mono-butyl ether of diethylene glycol, sodium salt.
11. The reaction product of meta-phosphoric acid with sucrose mono-oleate, sodium salt.
12. The reaction product of meta-phosphoric acid with mixed coconut oil fatty acid mono- or diglycerides or mixtures of mono- and diglycerides, ammonium salt.
13. The reaction product of meta-phosphoric acid with mono-oleic acid ester of diglycerol, sodium salt.
14. The reaction product of meta-phosphoric acid with the mono-octyl ether of glycerol, potassium salt.
15. The reaction product of meta-phosphoric acid with di-caproin, sodium salt.
16. The reaction product of meta-phosphoric acid with the mono-lauryl ether of diethylene glycol, sodium salt.
17. The reaction product of meta-phosphoric acid with the mono-melissic acid ester of mannitol, ammonium salt.
18. The reaction product of meta-phosphoric acid with the di-cetyl ether of sorbitol, potassium salt.
19. The reaction product of meta-phosphoric acid with the di-stearic acid ester of triglycerol, potassium salt.
20. The reaction product of meta-phosphoric acid with the mono-butyric acid ester of tartaric acid.
21. The reaction product of meta-phosphoric acid with mono-palmitic acid ester of glycerol, ammonium salt.
22. The reaction product of meta-phosphoric acid with mono-myristic acid ester of glycerol, sodium salt.
23. The reaction product of meta-phosphoric acid with the di-oleic acid ester of diethylene glycol.
24. The reaction product of meta-phosphoric acid with octyl alcohol.
25. The reaction product of meta-phosphoric acid with lauryl alcohol.
26. The reaction product of meta-phosphoric acid with mixed coconut oil fatty alcohols.
27. The reaction product of meta-phosphoric acid with octadecyl alcohol.
28. The reaction product of meta-phosphoric acid with the mixture of alcohols derived from the reduction of sperm oil.
29. The reaction product of meta-phosphoric acid with ricinoleyl alcohol.
30. The reaction product of meta-phosphoric acid with butyl alcohol.
31. The reaction product of meta-phosphoric acid with oleyl alcohol.

It will be seen that I may select many different types of compounds as lipophile groups for the preparation of the improving agents which I employ herein, particularly those having at least eight carbon atoms although, in some instances, the lipophile group or groups may contain as low as four carbon atoms. For example, the following compounds may be utilized as sources of lipophile groups, and reaction products of meta-phosphoric acid therewith may be prepared by procedures described more fully hereinafter: butyl alcohol, amyl alcohol, hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, branched chain octyl, decyl, dodecyl, tetradecyl, hexadecyl and octadecyl aliphatic alcohols as, for example, 2-ethyl hexanol-1, 2-n butyl octanol-1, 2-butyl tetradecanol-1, and, in general, the higher molecular weight saturated and unsaturated aliphatic straight chain and branched chain alcohols. Preferably, the alcohols which I utilize are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred.

I may also employ cyclo-aliphatic or ali-cyclic alcohols such as the sterols, as, for example, cholesterol, iso-cholesterol, phytosterol, sitosterol, hydro-aromatic alcohols such as abietol, and such unsaturated alcohols as linalool, citronellol, geraniol and the like. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, i-hydroxystearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like.

The term "alcohols," as employed herein, is intended to include alcohols which may or may not contain other groups such as carboxylic, halogen, sulphonic, sulphate, or other radicals. The alcohols obtainable by substituting alkyl or acyl radicals, preferably of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols from which the reaction products which I employ herein may be produced. As examples of such alcohols may be mentioned partially esterified or partially etherified sugars and sugar alcohols such as monolauric acid ester of sucrose, monostearic acid ester of dextrose, monopalmitic acid ester of mannitol, dicaproic acid ester of maltose, mono-octyl ether of sorbitol, monolauryl ether of pentaerythritol, monolauric acid ester of pentaerythritol, and the like; the monoglycerides and diglycerides, preferably of the higher fatty acids, as, for example, monolaurin, monomyristin, monostearin, distearin, diolein, dicaproin, dimyristin; mono-lauryl ether of glycerol, di-cetyl ether of glycerol, monostearic acid ester of diethylene glycol, monolauric acid ester of ethylene glycol, and the like.

It is, of course, obvious that the alcohols may be prepared in accordance with any desired method. For example, these alcohols may be prepared by the so-called Bouveault and Blanc method or, alternatively, by the reduction or catalytic reduction with hydrogen of natural or hydrogenated animal or vegetable fats and oils or fatty acids in accordance with well-known practices. Again, the alcohols may be derived from synthetic processes such as by the oxidation of hydrocarbons or they may be prepared by saponification of waxes and the like. Alternatively, they may be prepared by reduction of aldehydes or by the Grignard reaction. Still other methods known in the literature may likewise be employed if desired or deemed expedient. It is likewise apparent that mixtures of the foregoing or other alcohols may be utilized as, for example, the mixture of alcohols resulting from the hydrogenation of coconut oil or the free fatty acid of coconut oil. Lauryl alcohol comprises about 45% of the total alcohol mixtures, the remaining alcohols running from $C_6$ to $C_{18}$. The reaction products of meta-phosphoric acid with these mixtures of alcohols function in substantially the identical manner as the reaction product of meta-phosphoric acid with substantially pure alcohols. Again, mixtures of alcohols such as are present in the so-called sperm oil alcohols, as well as those present in wool-fat, may equally efficaciously be utilized. Indeed, these higher molecular weight alcohols are generally, if, indeed, not almost invariably, offered on the market in the form of mixtures of different alcohols. If desired for any specific purpose, special fractions which predominate in a certain particular higher molecular weight alcohol may be utilized or, if so desired, the reaction products with meta-phosphoric acid may be prepared from a single, substantially pure alcohol. The source of the alcohols or higher molecular weight alcohols from which my reaction products are prepared is entirely immaterial.

So far as my improving substances are concerned which are derivatives of polyhydroxy substances, I may select many different types of compounds as lipophile groups which are to be linked to the polyhydroxy substances, principally compounds having lipophile radicals of relatively higher molecular weight. For example, the following materials may be utilized as sources of lipophile groups: carboxylic or fatty acids such as butyric acid, caprylic acid, caproic acid, capric acid, saturated and unsaturated higher molecular weight aliphatic acids such as the higher fatty acids containing at least 6 carbon atoms and including melissic acid, stearic acid, oleic acid, ricinoleic acid, linoleic acid, lauric acid, myristic acid, palmitic acid, mixed higher fatty acids derived from animal or vegetable sources, for example, lard, coconut oil, sesame oil, corn oil, cottonseed oil, sardine oil, partially or completely hydrogenated animal and vegetable oils such as those mentioned, fatty acids derived from various waxes such as beeswax, spermaceti, montan wax, and carnauba wax, hydroxy higher aliphatic or fatty acids such as 1-hydroxy-stearic acid, alpha hydroxy-stearic acid, alpha hydroxy-palmitic acid, alpha hydroxy-coconut oil fatty acids and similar hydroxy and alpha hydroxy higher fatty acids, carboxylic acids derived by oxidation and other methods from petroleum, hydroaromatic acids such as naphthenic acid, abietic acid, hydroxy aromatic acids such as hydroxy benzoic acid, aromatic acids such as benzoic acid, naphthoic acid, and the like.

As indicated, instead of reacting the meta-phosphoric acid with esters of polyhydroxy substances, I may also effect the reaction of the meta-phosphoric acid with ethers of polyhydroxy substances. The esters as well as the ethers of the polyhydroxy substances which may be employed for reaction with meta-phosphoric acid to produce the reaction products which I utilize herein may be prepared in accordance with methods well known in the literature and which, therefore, need not be described herein.

The polyhydroxy substances which provide the linkage between the lipophile group or groups and the meta-phosphoric acid radical or radicals may be selected from a large class and include glycerol; glycols such as ethylene glycol, propylene glycol, trimethylene glycol, butylene glycol and the like; polyglycols such as diethylene glycol; polyglycerols such as diglycerol, triglycerol, tetraglycerol and the like including mixtures thereof; mono-, di-, and poly-saccharides including sugars such as dextrose, sucrose, xylose, galactose, fructose, maltose, mannose and the like; starches, dextrins, cellulose, inulin; sugar alcohols such as arabitol, mannitol, sorbitol and dulcitol; and polyhydroxy carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character and hydroxyethyl and hydroxypropyl ether derivatives of the above, as for example:

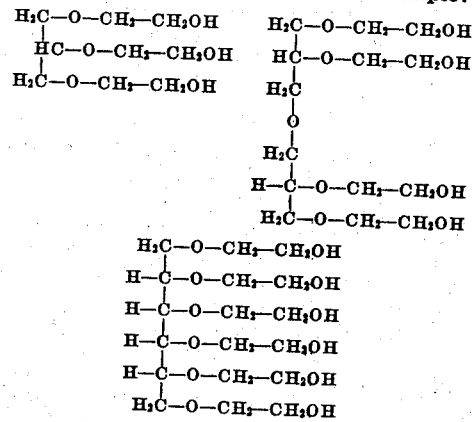

Procedural details of the methods by means of which the improving materials employed in my invention are prepared may be varied. The exact method employed should be determined primarily by considering the type of reacting constituents of the final substance to be produced. In all instances the compound reacted with the meta-phosphoric acid contains either at least one double bond or a reactive hydroxyl radical. The molal ratios of the reacting constituents may be varied to produce products having different properties and characteristics. A condensing agent and/or solvent may be added where required.

In order that others skilled in the art may even more fully understand how to prepare the improving materials which I employ herein in accordance with my invention, I shall describe various specific embodiments in detail. It is to be understood, however, that the following examples are given only by way of illustration and are not to be construed as limitative of the methods which may be employed in the production of the reaction products which I utilize herein. For example, it is evident that the proportions of reacting constituents, temperatures of reaction, time of reaction, and the like represent factors which may be varied, all within the skill of those versed in the art in the light of my teachings herein.

Example I (a) To 700 grams of commercial meta-phosphoric acid at 85 degrees C. there were added with stirring 276 grams of monolaurin at 85 degrees C. The temperature of the mass rose to approximately 105 to 110 degrees C. after which it was allowed to cool.

(b) To 190 grams of the resulting mass there were added 190 grams of anhydrous sodium carbonate at room temperature. The temperature rose above 20 degrees C. The mixture was finely pulverized.

Example II

To 70 parts by weight of meta-phosphoric acid, previously heated to 90 degrees C., 25 parts by weight of commercial octadecyl alcohol, also previously heated to 90 degrees C., were slowly added with vigorous stirring. The temperature rose to about 100 degrees C. It was then allowed to cool.

Example III 25 parts by weight of oleic alcohol, previously heated to approximately 90 degrees C., were added slowly, with stirring, to 35 parts by weight of commercial meta-phosphoric acid, also previously heated to 90 degrees C. The temperature rose to 120 degrees C. At room temperatures, the product became a heavy, nearly solid paste.

Example IV (a) A mixture of 2 and ½ parts of cottonseed oil, 2 and ½ parts of hydrogenated cottonseed oil having an iodin value of 68 to 70, and 5 parts of glycerin were heated to a temperature of 250 to 260 degrees C. for 2 hours using 0.005 parts of sodium hydroxide as a catalyst. The reaction mixture was heated in a non-oxidizing atmosphere, such as carbon dioxide, and was continuously stirred during the entire reaction. After the completion of the reaction, the mass was permitted to stand and the excess glycerin, which constituted the bottom layer, was drawn off from the desired monoglycerides which comprised the top layer.

(b) To 80 parts of meta-phosphoric acid at room temperature (30 degrees C.) were added 75 parts of the above described monoglyceride at room temperature (30 degrees C.). The two components were then well mixed. The reaction mass was then mixed for about 30 minutes longer.

Example V (a) 38 parts by weight of commercial lauryl alcohol, previously heated to 90 degrees C., were slowly added with stirring to 140 parts by weight of meta-phosphoric acid, also previously heated to 90 degrees C. The temperature rose to 115 degrees C. The reaction product was a pale amber, semi-viscous liquid when hot, soluble in water, and had good foaming properties.

(b) 18 parts by weight of the product of Example VI were intimately mixed, at room temperature, with 20 parts of anhydrous sodium carbonate. The temperature rose to about 40 degrees C. to 50 degrees C. The reaction mixture was then mixed and ground until a fine, white pulverulent product was obtained. The product, when dissolved in water, gave a clear solution which was neutral to litmus and foamed well.

Example VI

Approximately 25 parts of the coconut oil mono fatty acid ester of ethylene glycol were poured into about 100 parts of meta-phosphoric acid and the two were mixed together until homogeneous. When the temperature had ceased rising, the mass was heated to 90 degrees C. with stirring. When no further temperature rise was noted, the mass was permitted to cool and was then extracted with ether. The ether extract may be neutralized by passing into the same a gaseous stream of ammonia until a definite color change is noted.

In place of the coconut oil mono-fatty acid ester of ethylene glycol, I may use the coconut oil mono-fatty acid ester of diethylene glycol.

Example VII 60 parts by weight of diolein, previously heated to 90 degrees C., were added slowly with stirring to 35 parts by weight of meta-phosphoric acid. The temperature rose after a few minutes to about 125 degrees C. On cooling, the product became viscous.

Example VIII

Approximately 75 parts of mono stearin (washed and dried) were heated to 90 degrees C. and were added to about 35 parts of meta-phosphoric acid also heated to the same temperature and the two were mixed until a homogeneous mass was obtained. The mass was stirred continuously until the heat of reaction ceased after which it was extracted with ether and neutralized and the ether evaporated.

Example IX 35 parts by weight of mixed coconut oil mono fatty acid esters of diethylene glycol, at a temperature of about 90 degrees C., were mixed with 40 parts by weight of meta-phosphoric acid, the ester being added to the acid as described in the above examples. The temperature rose to about 130 degrees C. This product, after cooling to room temperature, was then neutralized in one case with triethanolamine and in another case with mono-ethanolamine. In each case, products resulted having excellent foaming properties.

While the illustrative examples listed hereinabove represent, in some cases, single substances, it must be understood that the invention is not limited to the use thereof. Indeed, in practice, it is frequently, if, indeed, not invariably, more convenient to prepare a mixture of the reaction products and to use such mixture. For example, I may prepare mixtures of monoglycerides and diglycerides of higher fatty acids by any convenient method, as, for example, by direct esterification of glycerol with higher fatty acids or by reesterification of a triglyceride oil or fat with glycerol, preferably in the presence of a catalyst, and then react the resulting mixture with meta-phosphoric acid. Moreover, in place of pure mono-stearin, for example, I may utilize a commercial product which contains small proportions of mono-palmitin and mono-olein, or small proportions of the di-fatty acid esters of glycerol.

The polyhydroxy substances which provide the linkage between the lipophile group or groups and the hydrophile meta-phosphoric acid group or groups, in those of the reaction products which I employ herein which are derivatives of polyhydroxy substances, may be conveniently considered as falling into two groups. The first of these groups includes compounds containing less than four hydroxy groups and is exemplified by glycerin, glycols and polyglycols. The second group contains those substances which have more than three hydroxy groups, examples of which are the sugars and sugar alcohols, polyglycerols such as di- and tri-glycerol, etc. It will be understood that, in this class of the reaction products which I employ herein, there may be present one or more lipophile radicals and one or more hydrophile meta-phosphoric acid radicals attached to the polyhydroxy substance. Thus, for example, I may react one mol of meta-phosphoric acid with one mol of the mono-oleic acid ester of glycerol or, alternatively, I may react two mols or more mols of meta-phosphoric acid with one mol of the mono-oleic acid ester of glycerol. Similarly, I may react one or more mols of meta-phosphoric acid with one mol of the distearic or other fatty acid esters of di- or triglycerol or the like. In a similar way, as described above, instead of the acyl derivatives of the polyhydroxy substances, I may employ the corresponding alkyl or ether derivatives.

While, in general, I react meta-phosphoric acid with a compound containing an alcoholic hydroxyl group, I may, in certain instances, utilize compounds having double bonds and no esterifiable hydroxy groups for reaction with polyphosphoric acids. Illustrative of such compounds are, for example, tri-olein, mono-olein-distearin, corn oil, olive oil, cocoa butter, lard, and the like. In castor oil, for example, double bonds as well as free hydroxy groups are present.

I may utilize the reaction products as such or they may be neutralized with suitable anti-acid materials. In this connection, considerable latitude and modification may be exercised. In general, inorganic as well as organic anti-acid agents may be employed and the neutralization may be in whole or in part. Examples of inorganic and organic anti-acid agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, potassium stearate, sodium stearate, non-toxic and innocuous organic anti-acid nitrogenous materials, as well as other anti-acid materials which serve to replace hydrogen of the meta-phosphoric acid group or groups by cations such as sodium, potassium, ammonium, etc., the term "cation" being used to include, in general, atoms or radicals which are regarded as bearing a positive charge. The reaction products may be neutralized to methyl orange, litmus, or phenolphthalein. As a general rule, if the salts of the reaction products are employed, it is preferred to utilize the sodium, potassium, ammonium or other soluble salts.

While I have described various examples of the preparation of the reaction products which I employ in accordance with my invention, it must be understood that the scope of the class of reaction products is by no means limited by these methods. Other convenient methods may be used. This also applies, and particularly so, to supplementary procedures of purification or isolation which lie strictly within the province of the skill of any qualified chemist whose procedures in each instance must be governed by the properties of the materials concerned and by the degree or character of the purity desired.

As illustrative of the unusual results emanating from the practice of my invention, reference may be had to the use of the improving agents in angel food cakes.

A standard angel food cake, for comparison purposes, was first prepared from the following formula, expressed in parts by weight, in this instance, grams:

| | |
|---|---|
| Egg whites | 600.0 |
| Finely granulated sugar | 600.0 |
| Cream of tartar | 9.0 |
| Cake flour | 218.0 |
| Salt | 3.5 |
| Vanilla | 5.0 |

The egg whites were preliminarily whipped or beaten for one minute. A sifted mixture of the cream of tartar, salt and 150 grams of sugar was then added to the beaten egg whites in the space of about a minute and the mass was whipped for an additional ten minutes. The remaining 450 grams of sugar and the flour, sifted three times, were then added, with the beater running at low speed, gradually over a period of one-half minute, and the mass was mixed for another one-half minute. The vanilla was then mixed in and the cake was baked in an electric oven at a temperature of 350 degrees F. for a period of 20 minutes.

In accordance with one example of the practice of my invention, the same procedure described hereinabove was followed with the exception that 1.8 grams of the reaction product of part (a) of Example V, were employed. In order to effect a uniform dispersion of the reaction product throughout the batter, said reaction product was preliminarily macerated in a mortar with 12 cc. of water and the resulting dispersion incorporated into the liquid egg whites.

The contrast between the standard cake and the cake produced in accordance with my invention was marked. The outer appearance of the standard cake and the color of the crumb thereof were inferior to the other cake. The volume of the standard cake was 1192 cc. as against 1460 cc. for the other cake. Furthermore, the "chewability" of the standard cake was definitely inferior to the other cake.

In another example, using the same standard and following the same procedure but employing 3.8 grams of the reaction product of part (b) of Example V, the contrast between the standard cake and the cake prepared as described in accordance with my invention was marked. The color of the crumb of the standard was slightly darker than that of the cake produced in accordance with my invention and the volume of the cake produced in accordance with my invention was 1508 cc. as against a volume of 1192 cc. for the standard.

In order to show readily the marked advantages and unusual effects brought about by my invention, I have, as described above, adopted a standard cake and procedure of making it, following the same general procedure in illustrating the features of my invention in order properly to compare the results. It will, of course, be evident that different standards may be adopted and the practice of the invention may be effected with different formulae and different mixing procedures. Thus, for example, any known formulae or modifications of known formulae for preparing angel food cakes and the like may be employed. Similarly, various mixing procedures may be resorted to as, for example, mixing all of the sugar with the egg whites prior to the addition of any of the flour, and the like. In all such cases, so far as I am aware, the practice of my invention brings about distinct and important improvements.

In general, I have found that a pH of 4.0 to 6.0, and preferably 5.0 to 5.5, of the batter produces good results. However, the pH range may vary considerably with the production of satisfactory baked products and the mentioned pH ranges are to be considered preferable but in no sense limitative of the scope of my invention.

While the most outstanding utility of the improving agents in accordance with my present invention appears to lie in conjunction with the preparation of flour batters and cakes of the type known as angel food, the principles of my novel teachings may also be employed in the preparation of other flour compositions, flour batters and cakes which are devoid or substantially devoid of shortening, particularly those which do not employ a leavening agent such as baking powder or the like but rely upon the incorporation of air in the batter to provide the leavening action. Into this category, for example, fall certain types of sponge cakes and baked flour products used in making roll cakes. In this connection, as well as in general, it must not be assumed that in every case will every one of the advantages result which I have stated above emanate from the practice of my invention, nor will those that do necessarily manifest themselves to the same degree in every instance. In all cases, however, so far as I am aware, at least one and, in general, several advantages will result from following my novel teachings herein.

In place of egg whites or egg albumen, I may, in certain cases substitute therefor, in whole or in part, proteins or protein-like materials which function similarly to egg whites or egg albumen, particularly with respect to incorporation of air by beating or similar mechanical treatment. Thus, for example, the protein ingredient may take the form of de-fatted soya bean flour, proteinaceous extracts of soya bean, milk whey and blood serum in either liquid, concentrated or desiccated form, and the like. For convenience, I consider these materials, including egg whites and egg albumen, as "beatable proteins."

In the preparation of the flour compositions of my invention, I prefer to preliminarily admix the meta-phosphoric acid reaction products with the egg material or beatable protein prior to whipping or beating the same to incorporate air therein, particularly since the stability and character of the resulting foam are materially improved over such properties of untreated egg material or beatable proteins.

It will be understood that the reaction products may be incorporated into the batter in any suitable manner, care being taken, however, to effect a substantially uniform distribution thereof throughout the batter. Since the amount of the reaction product incorporated into the batter is relatively small, giving due regard to the fact that the proportions thereof may be rather widely varied as pointed out hereinafter, I find it advisable to adopt the method of incorporation described hereinabove. Any other suitable or desired method may, however, be employed.

I have previously indicated that the practice of my invention brings out improvements not only in the final baked products but usually also in the batters from which such products are baked. In general, this improvement manifests itself in enhanced smoothness and fluffiness, excellent body and stability and increased volume resulting principally from incorporation of additional air.

Since the practice of my invention generally brings about a substantial increase in volume, lower scaling weights may, if desired, be employed with the obtention of as great a volume of cake as would result were a larger scaling weight employed if methods heretofore known were utilized. Alternatively, if the same scaling weight is used, a cake having a substantially increased volume is obtained. In certain instances, by adjustment of proportions or selection of particular reaction products or both, the improvements can be directed more towards improvement in color, grain, texture, "chewability" and general all-round appearance of the baked product or cake and volume increase may be a secondary matter. Under any circumstances, the improvements which result, into whatever fields they may be categorized, are substantial.

It will, of course, be appreciated that reaction products will be employed concerning the edibility of which no question can arise. Similarly, it will be advantageous to utilize reaction products which are free or substantially free of odors and flavors which might be objectionable in food products although, in view of the fact that the reaction products are generally employed in relatively small proportions, this matter will offer no difficulty. While, in the description of the reaction products hereinabove, I have disclosed some products which might be considered unsuitable for edible purposes, as, for example, reaction products in which a naphthoic or similar acid radical is present, such compounds have been mentioned to illustrate the breadth and scope of the principles of my invention rather than as practical examples of reaction products which necessarily would be suitable from the standpoint of edibility. Those skilled in the art will obviously be able readily to select suitable edible reaction products for specific purposes in the light of my teachings herein.

It will also be appreciated that the proportions of the improving substances or reaction products may vary within relatively wide limits without departing from the spirit of my invention. Thus, for example, I may employ as little as 0.1%, based on the weight of the batter as a whole, or even less, and as much as 0.5%, based upon the weight of the batter as a whole, or even more. The exact amount will naturally depend upon the potency of the particular reaction product employed, the character of the flour and egg whites, the specific nature of the batter or cake which is to be produced, the particular batter procedure employed, and the character of the results sought, that is, whether the improvement desired be principally with respect to volume, grain or texture or the like. As a general rule, between 0.15% and 0.25%, based upon the weight of the batter as a whole, will be satisfactory in most cases.

By the term "reaction product of meta-phosphoric acids with * * *," as used herein and in the appended claims, I intend to include not only the unneutralized reaction product but also the product either partially or completely neutralized with suitable anti-acid materials as previously described.

The term "higher," as used herein and in the claims with reference to higher molecular weight alcohols or in similar expressions, will be understood to mean at least six carbon atoms, unless otherwise specifically stated.

What I claim as new and desire to protect by Letters Patent of the United States is:

1. A non-shortening-containing cake of the angel food type containing flour, beatable protein, sugar, moisture, and a proportion of a reaction product of metaphosphoric acid with an alcohol containing at least four carbon atoms.

2. A non-shortening-containing cake of the angel food type containing flour, beatable protein, sugar, moisture, and a proportion of a reaction product of meta-phosphoric acid with an alcohol corresponding to the alcohols derivable from triglyceride oils, fats, waxes, and higher fatty acids.

3. A non-shortening-containing cake of the angel food type containing flour, beatable protein, sugar, moisture, and a proportion of a reaction product of meta-phosphoric acid with an alcohol in the form of a polyhydroxy substance wherein the hydrogen of at least one hydroxy group of said polyhydroxy substance is replaced by a radical selected from the group consisting of alkyl and acyl radicals containing at least four carbon atoms.

4. A baked flour product, substantially free of shortening, and containing flour, egg whites, sugar, moisture, and a small proportion of a reaction product of meta-phosphoric acid with an aliphatic alcohol containing at least four carbon atoms.

5. An angel food cake containing flour, egg whites, sugar, moisture, and a small proportion of a reaction product of meta-phosphoric acid with a straight chain aliphatic alcohol containing from 12 to 18 carbon atoms.

6. A baked flour product, substantially devoid of shortening, containing flour, egg whites, sugar, moisture, and a small proportion of a reaction product of meta-phosphoric acid with lauryl alcohol.

7. An angel food cake containing flour, egg whites, sugar, moisture, and a small proportion of a reaction product of meta-phosphoric acid with octadecyl alcohol.

8. A baked flour product, substantially devoid of shortening, containing flour, egg whites, sugar, moisture, and a small proportion of a reaction product of meta-phosphoric acid with an alcohol in the form of an aliphatic polyhydroxy substance wherein the hydrogen of at least one hydroxy group of the aliphatic polyhydroxy substance is replaced by a higher molecular weight acyl radical, said polyhydroxy substance being a member of the group consisting of glycerol, glycols, polyglycerols, polyglycols, sugars, sugar alcohols, and hydroxy-carboxylic acids.

9. An angel food cake containing flour, egg whites, sugar, moisture, and a proportion of a reaction product of meta-phosphoric acid with an alcohol in the form of an aliphatic polyhydric alcohol wherein at least one hydroxy group of the alcohol has its hydrogen replaced by an acyl group containing at least four carbon atoms.

10. A cake batter, substantially devoid of shortening, containing flour, egg whites, sugar, moisture, and a small proportion of a reaction product of meta-phosphoric acid with an alcohol in the form of a fatty acid monoglyceride, the fatty acid radical containing from twelve to eighteen carbon atoms.

11. The method of preparing non-shortening-containing cakes of the angel food type having excellent volume, taste and texture, comprising providing a body of beaten egg whites having dispersed therein a proportion of a reaction product of meta-phosphoric acid with an alcohol containing at least four carbon atoms, and then folding sugar and flour thereinto.

12. The method of preparing non-shortening-containing cakes of the angel food type having excellent volume, taste and texture, comprising providing a body of beaten egg whites having dispersed therein a proportion of a reaction product of meta-phosphoric acid with an aliphatic straight chain alcohol containing at least eight carbon atoms and then folding sugar and flour thereinto.

13. The method of preparing non-shortening-containing baked products having excellent volume, taste and texture, comprising forming an aqueous solution or dispersion of a reaction product of meta-phosphoric acid with a higher molecular weight alcohol, and then incorporating the same with egg whites, beating the modified egg whites, incorporating flour and sugar to form a batter, and baking the resulting batter.

14. The method of preparing non-shortening-containing cakes of the angel food type having excellent volume, taste and texture, comprising forming a batter containing flour, beaten egg whites, sugar, an acidifying agent such as cream of tartar, and a small proportion of a reaction product of meta-phosphoric acid and an aliphatic alcohol containing at least eight carbon atoms, the pH of the batter being of the order of about 4.5 to 6.0, and then baking said batter.

15. An angel food cake baked from a batter having a pH between about 4.5 and 6.0 and containing flour, egg whites, sugar, moisture, and a small proportion of a reaction product of meta-phosphoric acid with an aliphatic alcohol containing a chain of at least eight carbon atoms.

16. Flour batters, substantially devoid of shortening, containing flour, albumen, sugar, moisture, and a small proportion of a reaction product of meta-phosphoric acid with an alcohol containing at least twelve carbon atoms.

17. An angel food cake containing flour, egg whites, sugar, moisture, and a small proportion of a reaction product of meta-phosphoric acid with coconut oil mixed fatty alcohols.

18. A baked flour product, substantially free of shortening, and containing flour, egg whites, sugar, moisture, and a small proportion of a reaction product of meta-phosphoric acid with a lipophile material having at least eight carbon atoms and containing at least one hydroxy group.

19. A non-shortening-containing flour composition containing, in addition to flour, beatable protein, sugar, moisture, and a proportion of a reaction product of meta-phosphoric acid with a lipophile material having at least eight carbon atoms and containing at least one hydroxy group.

20. A non-shortening-containing flour composition containing flour, egg material, sugar, moisture, and a proportion of a reaction product of meta-phosphoric acid with a higher molecular weight aliphatic alcohol.

21. Cake, at least substantially devoid of shortening, containing flour, egg material, sugar, moisture, and between about 0.1% and 0.5%, based on the weight of the cake batter, of a reaction product of meta-phosphoric acid with an alcohol containing at least eight carbon atoms.

22. The method of preparing non-shortening-containing baked products having excellent volume, taste and texture, comprising forming an aqueous solution or dispersion of a reaction product of meta-phosphoric acid with a higher molecular weight aliphatic alcohol, and then incorporating the same with beaten egg material, flour, and sugar to form a batter, and baking the resulting batter.

MORRIS KATZMAN.